Aug. 31, 1943.   L. R. PROVOST   2,328,295
FISH LURE
Filed July 26, 1941

Inventor:
Laurence R. Provost
By Homer H. Sweet
Attorney

Patented Aug. 31, 1943

2,328,295

UNITED STATES PATENT OFFICE 2,328,295

FISH LURE

Laurence R. Provost, Cheyenne, Wyo.

Application July 26, 1941, Serial No. 404,134

4 Claims. (Cl. 43—48)

This invention relates to fish hooks and lures, and more particularly to artificial flies of the type commonly employed as bait or lures in certain types of fishing, and has as an object to provide an improved hook construction adapted for incorporation in and with an artificial fly to enhance the simulation of a natural fly and thereby increase the effectiveness of the lure.

A further object of the invention is to provide an improved artificial fly formed in relatively-hinged sections susceptible of limited relative motion to simulate a natural fly or insect.

A further object of the invention is to provide an improved hook construction susceptible of incorporation in and with an artificial fly to enhance simulation of a natural insect by the resulting combination.

A further object of the invention is to provide an improved combination of barbed hook and link elements constituting a fish hook for association with elements of an artificial fly to permit simulation of a natural insect through relative movement between elements of said hook.

A further object of the invention is to provide an improved fish hook having hingedly-associated elements adapted to support artificial flies of various types and specific arrangements.

My invention consists in the construction, arrangement, and combination of elements hereinafter set forth, pointed out in my claims, and illustrated by the accompanying drawing, in which—

Figure 3:
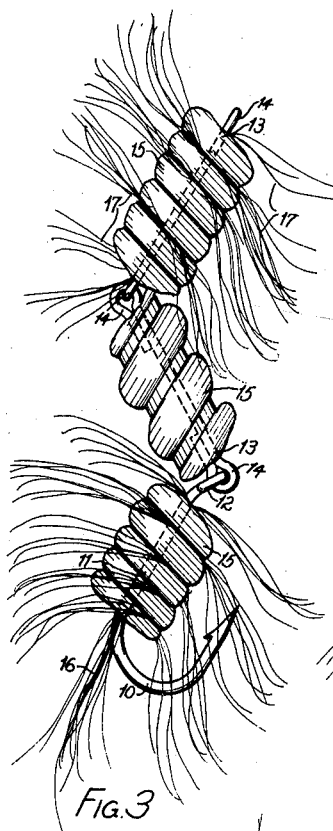
Figure 1:
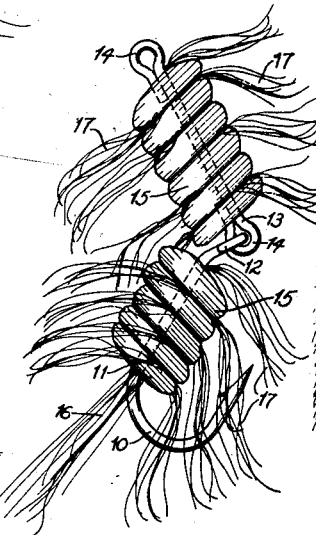
Figure 4:
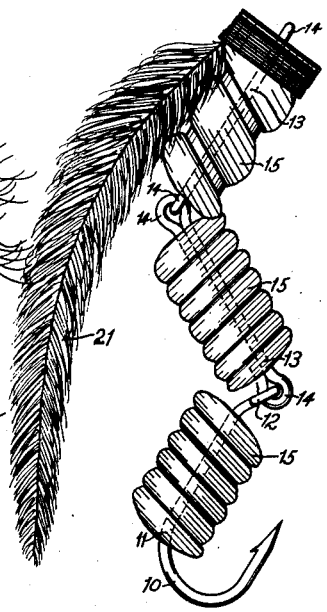
Figure 5:
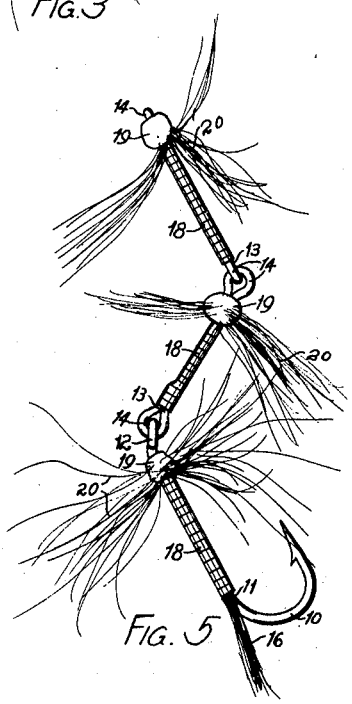
Figure 2:
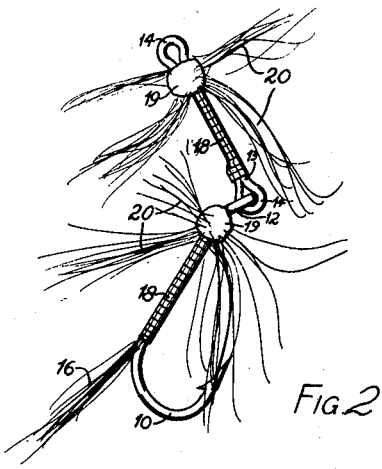

Figure 1 is a side elevation of a simple embodiment of the invention as incorporated with elements simulating one type of fly. Figure 2 is a view similar to Figure 1 illustrating a dressing of the hook to simulate a different type of fly. Figure 3 is a side elevation of an alternative hook construction dressed to simulate the type of fly shown in Figure 1. Figure 4 is a view of the hook construction shown in Figure 3 as dressed to simulate yet another type of fly. Figure 5 is a view of the hook construction shown in Figure 3 as dressed to simulate the type of fly shown in Figure 2.

In its various modifications and aspects, the improvement includes a barbed hook member having a relatively short shank and one or more links hingedly associated with said shank and with each other, and sections, members, or elements of artificial fly lures carried by the hook shank and the links in a manner to permit of relative movement between said sections, members, or elements when the lure is associated with a suitable line in a conventional manner and caused to move on or in water; the relative movement between sections, members, or elements of the lure imparting action simulating natural life to the bait thus formed.

In the construction of that embodiment of the improvement shown in Figure 1, a barbed hook 10 of conventional type is provided with a relatively short, straight, shank 11 terminating in a closed eye 12. A straight link 13, having a length preferably substantially equal to that of the hook and shank, is formed with an eye 14 at each of its ends and hingedly associated with the hook member through engagement of one of its eyes 14 with the eye 12 of the hook, the eye 14 on the free end of the link 13 being adapted for engagement with a fish line, leader, or the like. The link 13 may be of any suitable specific construction, and is conveniently formed of a length of wire bent to shape the eyes 14 and position free ends of the wire length in paralleling contact with the wire connecting said eyes. The construction shown and described facilitates engagement of the link with the eye 12 of the hook, although no insurmountable mechanical problem results from connection of the hook with a link having permanently-closed eyes formed at its ends. To complete the fish lure, a fly is tied on the link and hook combination, a portion of the desired fly being mounted on and secured to the link while another portion thereof is mounted on and secured to the shank of the hook. The type of fly shown in Figure 1 includes a rather bulky body portion or section 15 secured to and substantially covering the length of the shank 11 and link 13, a tail 16 in trailing relation with the body portion 15 on the shank 11, and hackles 17 extending outwardly as may be desired from both of the body portions 15. Due to the hinged relationship between the hook and link members, the hook member and its associated fly elements will not continuously trail in a straight line directly behind the link 13, but will oscillate under the influence of water currents, eddies, and tension on the fish line so as to simulate the wiggling and natural actions of living insect, thus greatly increasing the attractive effectiveness of the lure. The hinged connection between the shank 11 and link 13, may be accomplished through any specific mechanical arrangement suitable to permit the desired articulation of the connected elements, and it may be desirable in certain embodiments of the invention to offset a hook or link member out of direct trailing alignment with its associated member, as by means of an inclination of the eye 12, or certain of the link eyes, away from the axis of the associated shank or link.

The showing of Figure 2 is structurally identical with that of Figure 1, the only difference between the two views being in the type of fly tied to the hook and link members. In Figure 2, the hook and link members each support a slender body portion 18, a head portion 19, and hackles 20, radiating from the head portions 19, the hook member being additionally provided with a tail 16 disposed substantially as shown in Figure 1.

The showing of Figure 3 illustrates a modification of the hook and link assembly wherein a second link 13 is hinged, by engagement of their respective eyes, to the first link 13, each of said links as well as the hook member being dressed with a portion of the artificial fly desired. As will be apparent, the addition of the second link 13 enhances the wiggling or wriggling action of the lure in use, approximately simulating the contortion of a worm, caterpillar, or the like.

Figure 4 is structurally identical with the showing of Figure 3 and differs from the latter showing only in the type of fly or bait tied to the hook and link assembly. In Figure 4 the hackles and tail of the fly shown in Figure 3 are omitted and a wing 21 is added and shown as fixed adjacent the leading end of the leading link 13 to trail therefrom in laterally offset relation with the other elements of the assembly.

Figure 5 illustrates the appearance and structural relationships of the hook and link arrangement shown in Figures 3 and 4 when dressed in the manner shown in Figure 2.

The views of the drawing are but indicative of the many and varied types and specific arrangements of artificial flies which may be utilized in furnishing a lure of the character contemplated by the invention, it being obvious that any of the known artificial flies may be tied on the hook and link assemblies shown and described without in any way altering or departing from the spirit of the invention, hence I wish to be understood as being limited solely by the scope of the appended claims, rather than by any details of the illustrative showing and foregoing description.

I claim:

1. A fish lure comprising a barbed hook member formed with a relatively short, straight shank, an eye on the end of the shank in a plane inclined to the shank axis, a relatively short, straight link formed with an eye at each end and hingedly engaged at one end with the eye of said shank, and complementary artificial fly components carried by said shank and link for cooperation in contortably simulating a single natural insect.

2. A fish lure comprising a barbed hook member formed with a relatively short, straight shank terminating in an eye inclined to the shank axis, a relatively short, straight link hingedly engaging at one end with said eye, a second link hingedly engaging with the free end of said first link, and complementary artificial fly sections carried by said shank and links for cooperation in contortably simulating a single natural insect.

3. In a fish lure, a hook member formed with a relatively short shank angularly offset at its free end, link extensions hingedly associated with the offset end of said shank and with each other, and complementary sections of a single artificial fly carried by said shank and links for cooperation in simulating a contortable natural insect.

4. In a fish lure, a hook assembly adapted to support and carry an artificial fly simulating a contortable natural insect, said assembly comprising a hook member formed with a relatively short, straight shank angularly offset adjacent its free end and adapted to mount a terminal section of an artificial fly, a relatively short, straight link hingedly associated with the offset end of said shank and adapted to mount a complementary, intermediate artificial fly section, and a second link hingedly engaging the free end of the first link and adapted to mount a complementary artificial fly terminal section.

LAURENCE R. PROVOST.